US 6,592,647 B2

(12) United States Patent
Hino et al.

(10) Patent No.: US 6,592,647 B2
(45) Date of Patent: Jul. 15, 2003

(54) METHOD FOR PRODUCING METALLIC IRON

(75) Inventors: Mitsutaka Hino, Sendai (JP); Isao Kobayashi, Osaka (JP); Shoichi Kikuchi, Osaka (JP)

(73) Assignee: Kabushiki Kaisha Kobe Seiko Sho (Kobe Steel, Ltd.), Kobe (JP)

(*) Notice: Subject to any disclaimer, the term of this patent is extended or adjusted under 35 U.S.C. 154(b) by 0 days.

(21) Appl. No.: 09/923,352

(22) Filed: Aug. 8, 2001

(65) Prior Publication Data
US 2002/0050187 A1 May 2, 2002

(30) Foreign Application Priority Data

Aug. 9, 2000 (JP) .................................. 2000-241485

(51) Int. Cl.⁷ .............................................. C21B 13/08
(52) U.S. Cl. ........................ 75/500; 75/504; 75/484; 75/485
(58) Field of Search .................. 75/504, 484, 500, 75/485

(56) References Cited

U.S. PATENT DOCUMENTS

| 3,452,972 A | 7/1969 | Beggs |
| 6,036,744 A | 3/2000 | Negami et al. ............... 75/503 |
| 6,129,777 A | 10/2000 | Fuji et al. |
| 6,149,709 A | 11/2000 | Uragami et al. ............... 75/504 |
| 6,152,983 A | 11/2000 | Kamijo et al. |
| 6,210,462 B1 | 4/2001 | Kikuchi et al. |
| 6,214,087 B1 * | 4/2001 | Hoffman et al. ............... 75/504 |
| 6,251,161 B1 | 6/2001 | Tateishi et al. |
| 6,254,665 B1 | 7/2001 | Matsushita et al. |
| 6,258,149 B1 | 7/2001 | Sugiyama et al. |
| 6,270,552 B1 | 8/2001 | Takeda et al. |
| 6,284,018 B1 | 9/2001 | Uragami et al. |
| 6,296,479 B1 | 10/2001 | Nishimura et al. |
| 6,334,883 B1 | 1/2002 | Takenaka et al. |
| 6,368,379 B1 | 4/2002 | Tateishi et al. |

FOREIGN PATENT DOCUMENTS

| EP | 0 969 105 | 1/2000 |
| FR | 1 307 112 | 9/1962 |
| GB | 922586 | 4/1963 |
| JP | 7-238309 | 9/1995 |
| WO | WO 99/11826 | 3/1999 |

* cited by examiner

Primary Examiner—Melvyn Andrews
(74) Attorney, Agent, or Firm—Oblon, Spivak, McClelland, Maier & Neustadt, P.C.

(57) ABSTRACT

A method for heating, reducing and melting a raw material mixture containing carbonaceous reducing agents and an iron oxide-contained substance to manufacture metallic iron, characterized in that a liquid fraction in a solid and liquid coexisting phase of produced slag containing a multi-component gangue is controlled to thereby accelerate melting of solid metallic iron produced.

15 Claims, 3 Drawing Sheets

METHOD FOR PRODUCING METALLIC IRON

BACKGROUND OF THE INVENTION

1. Field of the Invention

The present invention relates to an improvement in the technique for obtaining metallic iron by heating and reducing an iron oxide source such as iron ore by carbonaceous reducing agents such as coke, and a method improved so as to efficiently reducing iron oxide to metallic iron by simple treatment, to efficiently separate produced metallic iron from a slag forming component mixed in iron ore or the like as a gangue component, to produce metallic iron particles of high purity with high yield.

2. Description of the Related Art

Recently, many studies have been progressed with respect to a direct iron producing method for forming a raw material mixture containing an iron oxide source (such as iron ore) and carbonaceous reducing agents (such as coke), heating the former to thereby reduce iron oxide in the iron oxide source by the carbonaceous reducing agents, and separating produced metallic iron from a by-produced slag component to produce metallic iron.

The present inventors have also progressed the study on the direct iron producing method of this kind since long ago, and developed the following method as a result of the study, and further progressed study.

This method comprises, in producing metallic iron by heating and reducing a compact containing carbonaceous reducing agents and iron oxide, reduced iron oxide in solid state by heating to thereby produce and grow a metallic iron shell, continuing solid reducing till iron oxide is not substantially present inside, further continuing heating to flow out the produced slag from the metallic iron shell, and afterward separating metallic iron from slag.

In carrying out the above method, a part of the metallic iron shell may be molten to thereby flow out the molten from the metallic iron shell. At this time, for melting a part of or the whole metallic iron shell, carbon resulting from carbonaceous reducing agents which is present inside the metallic iron shell may be dissolved (solution) in metallic iron (this phenomenon is sometimes called "carburizing") to thereby lower a melting point of the metallic iron shell.

Metallic iron of high purity obtained by the above method and the produced slag are cooled and solidified to crush the slag and the solidified metallic iron particles are subjected to classification by magnetic separation or a sieve, or metallic iron is separated from slag by heating and melting and due to a difference in specific gravity to thereby enable obtaining a material having high purity in excess of 95 mass %, or in excess of 98 mass %. Moreover, the disclosed invention provides a method for proceeding reducing of iron oxide in solid state, which can reduce molten FeO amount in the produced slag as less as possible, in which erosion and/or corrosion of refractories of a processing furnace caused by molten FeO is hard to occur, and which is expected that the above method be realized as a practical application from a viewpoint of maintenance of equipment.

Among the above methods, the method for cooling and solidifying the produced metallic iron and the produced slag, crushing the produced slag and thereafter obtaining metallic iron particles by magnetic separation or the sieve seems to be suitable for the application to an industrial scale as compared with a method for separating them by a difference in specific gravity after melting. That is, in the melting and separating method, it is necessary to heat at high temperature for melting, because of which a great heat energy is required, and in addition, when both are separated, a part of molten iron is entrained in molten slag at an interface to possibly lower yield of metallic iron. On the other hand, in the method for obtaining metallic iron particles by crushing, magnetic separation or a sieve, heat energy is unnecessary, and in addition, design of a continuous separating system according to a scale of iron-manufacturing equipment are easy, and iron loss can be also minimized.

The above disclosed invention has stressed that in the heating and reducing step, the metallic iron shell is produced, and a high-degree reducing atmosphere is formed within the shell whereby metallizing is progressed efficiently. However, according to later study, it has been confirmed that when the neighborhood of a raw material compact is kept in a higher reducing atmosphere by a large amount of CO gas generated by combustion of carbonaceous reducing material included in the raw material compact, such a metallic iron shell is not always necessary.

On the other hand, with respect to the method for controlling a producing slag composition to accelerate separation of metallic iron when the direct iron manufacturing method as described above, several methods have been proposed.

For example,, there is a method for using ironmaking dust as a iron oxide source, mixing it with carbonaceous material (carbonaceous reducing agents) and additional material (slag forming agent), controlling a producing slag composition in a range of 1.4 to 1.6 at $CaO/SiO_2$ ratio (basicity), subjecting it to heating and reducing at 1250 to 1350° C. to produce metallic iron, and separating metallic iron particles from slag having a low melting point containing FeO.

However, this method is a method for using ironmaking dust as an iron oxide source, and control of basicity used in this method is at the time of initial raw material preparation. In this method, there is no recognition on the behavior of slag produced during heating and reducing, that is, behavior when the product slag turns to a molten state in a solid-liquid co-existing state affects on acceleration of separation of produced metallic iron. Further, In this method, the slag having a low melting point containing FeO is used to accelerate separation of metallic iron, but the method using the molten slag containing FeO has many problems noted below from a viewpoint of actual operation:

1) the molten slag containing molten FeO greatly damages fire brick of a hearth;
2) molten FeO comes in contact with carbonaceous material to produce reducing reaction, which reaction is endothermic reaction to make temperature control difficult; and
3) since metallic iron produced by contact reaction between molten FeO in slag and carbonaceous material is scattered in a fine granular form in slag, work for cooling and solidifying it together with slag after recovering becomes extremely complicated.

Accordingly, it is desirable to recover metallic iron efficiently while suppressing the production of molten FeO in the by-product slag.

There is a further method for, in charging a raw material mixture containing fine iron ore and solid reducing agents onto a moving hearth and heating and reducing it to produce metallic iron, previously laying fine solid reducing agents on the hearth, progressing heating and reducing in a state that the raw material iron ore is placed in a small-section on it not to contact directly with the hearth, and melting reduced iron at least once on the hearth. According to this method, the reason why "placed in a small section" as termed herein is to prevent the molten substance containing produced metallic iron by heating and reducing and by-product slag from being fused or stuck on the hearth surface to corrode the hearth. However, for carrying out the method as described above, not only complicated equipment is necessary in order to form the small section or to charge raw material into the small section but also a large quantity of fine solid reducing substances are necessary, which method is not to be considered as a practical method in view of efficiency of raw material. Moreover, in this method, formation of the small section rather accelerates fusion and sticking of the molten substance on the hearth surface to disturb the discharge of produced substances.

Further, the above invention takes measures for preventing the damage on the assumption that the molten substance produced by heating and reducing could give the damage to the hearth refractor. However, it is rather important, in terms of actual operation, to reduce the great amount of fine solid reducing agents. Further, also from a viewpoint of economy and design of equipment, it is desired that the technique be established to reduce the damage of hearth refractory by the slag itself, and so that even after cooling and solidifying, slag or metallic iron does not stick on the hearth surface.

There is another method for controlling basicity of a slag component in raw material to a range of 0.4 to 1.3, controlling not less than ⅓ of time required for heating and reducing on the hearth to a temperature range of 1200 to 1350° C. to make the reduction degree of iron oxide 40 to 80%, and subsequently, melting a reduced substance.

The control of basicity employed in this method is carried out by computation when raw material is prepared, and basicity is determined on the assumption that all the slag components in raw material are molten. However, whether or not all the slag components are molten changes depending on the operating conditions (particularly, temperature). Further, there is no pursued how dynamic behavior from the start of melting of slag to melting of the whole through the solid and liquid coexisting state affects on the separating condition of produced metallic iron and the erosion and/or corrosion of the hearth refractory. There is not recognized at all that the liquid fraction of the solid and liquid coexisting phase is controlled or melting of metallic iron is accelerated thereby.

With respect to the technique for heating, reducing and melting a mixture containing iron oxide source and carbonaceous reducing agents to manufacture metallic iron as described above, many proposals have been made. Recent problems pointed out in connection with the related art including the above matter are arranged and summarized as follows:

1) In heating, reducing and melting a mixture containing an iron oxide source carbonaceous reducing agents to manufacture metallic iron, it is necessary to establish the technique capable of melting solid produced metallic iron by reducing efficiently at a lower temperature, successfully separating it from the by-product slag, and separating and recovering metallic iron of high purity at a lower temperature and with high efficiency.

2) For achieving the aforementioned technique, it is desired that carburizing solid metallic iron produced by heating and reducing is accelerated to melt metallic iron at a lower temperature and efficiently, and successful separation from the by-product slag can be made to manufacture metallic iron of high Fe purity efficiently. Here, to enable controlling concentration of carbon property, which is an important factor of placing product metallic iron for practical use, is very advantageous of being used practically as steel-making material for electric furnaces or the like.

3) In the related art, some methods for controlling the slag component in raw material by basicity or the like have been proposed as mentioned above. They are proposed for the final product slag. However, if metallic iron can be molten and separated efficiently with the required minimum slag amount without melting the whole slag by-produced in the heating and reducing step, a bad influence on refractories of the hearth can be further decreased, and in addition, being advantageous in terms of heat efficiency and maintenance of equipment.

4) It is well known that molten FeO in slag greatly affects on the damage of the hearth refractory. For suppressing such damage, it is desirable to reduce the amount of molten FeO in the produced slag as less as possible. If reduction in the amount of molten FeO is realized, the damage of the hearth is relieved considerably accordingly to enable relieving particular mechanical or operational load required for the protection of the hearth.

SUMMARY OF THE INVENTION

The present invention has been accomplished paying attention to the problems as noted above. It is an object of the invention to provide a method capable of overcoming the problems as mentioned in 1) to 4) above completely to manufacture metallic iron of high Fe purity efficiently under the stable operation with suppressing the refractory damage of the hearth as less as possible.

The method for producing metallic iron according to the present invention provided is a method for heating, reducing and melting a raw material mixture containing carbonaceous reducing agents and an iron oxide-contained substance to manufacture metallic iron, comprising: controlling a liquid fraction in a solid and liquid coexisting phase of a producing slag containing a multi-component system gangue component to thereby accelerate melting of solid metallic iron produced, and efficiently separating metallic iron from by-produced slag at a lower operating temperature and with less time to manufacture metallic iron of high purity.

In carrying out this method, a liquid fraction in a solid and liquid coexisting phase of a producing slag containing a multi-component system gangue component is controlled, and the carbonaceous reducing agents are introduced into the slag in the liquid and solid state to accelerate carburizing relative to solid metallic iron whereby a melting temperature of the reduced iron, thus progressing melting of the reduced iron. It is desirable for effectively realizing such an operation as described to regulate the amount of carbonaceous reducing agents compounded in a raw material mixture so that concentration of carbon in metallic iron is 0.5 to 4.3 mass %, and to control so that a melting temperature of metallic iron subjected to carburizing is 1147 to 1500° C.

Further, the liquid fraction of the product slag can be regulated by mixing raw materials when the raw material is prepared. More specifically, there is a method in which when the raw material mixture is prepared, a relation between a temperature of the producing slag and the liquid fraction is obtained in advance from a composition of the raw material mixture, and the other slag component is added to the raw material component whereby the optimum slag liquid fraction is obtained in a predetermined operating temperature level, or there is a further method in which the liquid fraction is controlled by a target melting starting temperature after raw material has been reduced.

For achieving the object of the present invention more effectively, it is desired that the liquid fraction of the slag at the time of carburizing and melting be controlled to a range of 50 to 100 mass %, more preferably, a range of 70 to 100 mass %. As the raw material mixture, a raw material mixture may be used without modification or used in a suitably pressed state. However, more preferably, it is desired that a mixture is agglomerated into generally spherical, briquette-like or pellet-like form for heating and reducing.

According to the present invention, the liquid fraction of the product slag is regulated to thereby enable suitably controlling the carburizing amount to solid metallic iron to be produced and as a result, the carbon concentration of product metallic iron can be also controlled. Further, according to the present invention, metallic iron condensed by carburizing and melting is cooled and solidified to thereby enable obtaining metallic iron particles. The metallic iron particles can be separated from the cooled and coagulated feeble by-produced slag by a sieve or magnetic separation, and metallic iron particles can be easily recovered.

Further, the present invention is characterized in that metallic iron is manufactured efficiently preferably in a particle form. As the secondary effect resulting from the control of the liquid fraction of the producing slag employed in the manufacturing method, the by-produced slag can be separated and recovered in a granular or particle form with a relatively uniform size distribution. More specifically, the slag from gangue minerals in raw material is cooled after heating, reducing and melting, which is classified into a grassy granular slag produced from a liquid phase of a solid and liquid coexisting phase and a granular powder slag produced from a solid phase of a solid and liquid coexisting phase for separation and recovery. Then, the granular slag of uniform size and the granular powder slag can be obtained simply.

Further, according to the present invention, the molten FeO amount in the product slag can be reduced to not more than 50 mass %, preferably, to 0% substantially to thereby suppress the erosion/corrosion of the hearth refractory caused by mixing of a large amount of molten FeO into the slag as less as possible. Particularly, when the raw material mixture is heated and reduced, if a heating speed of the raw material mixture is raised to not less than 300° C./minute, the molten FeO amount in the producing slag can be effectively reduced, which is preferable.

As described above, the present invention has the greatest characteristics in that in heating, reducing and melting a raw material compact containing an iron oxide-contained material (hereinafter sometimes referred to as iron ore or the like) such as iron ore and iron oxide or its partial reduced substance and carbonaceous reducing agents such as coke and coal (hereinafter sometimes referred to as carbonaceous material) to manufacture metallic iron, a liquid fraction in a solid and liquid coexisting phase of a by-produced slag containing a multi-component system gangue component produced resulting from iron ore or the like is controlled to thereby efficiently progress carburizing of produced metallic iron, whereby a melting point of metallic iron is lowered quickly to thereby accelerate melting (hereinafter sometimes referred to as "melt-down").

As described previously, in the related art, a method has been proposed for regulating basicity or the like of by-produced slag in view of a melting point when the gangue component resulting from iron ore or the like is molten wholly. On the other hand, in the present invention, the by-produced slag is not always molten wholly, but a new conception, a liquid fraction in a solid and liquid coexisting phase of the by-produced slag is introduced to effect control, and the invention has been accomplished on the basis of new knowledge that the liquid fraction is in a close relation with the melt-down of metallic iron. That is, in the present invention, the liquid fraction is controlled property whereby the solid metallic iron produced by heating and reducing can be lowered in a melting point by progressing carburizing at a low operating temperature to thereby enable melting-down of metallic iron at a lower temperature. Thereby, separation from the by-produced slag can be progressed efficiently at a low temperature, and concentration of carbon greatly influencing on quality of product metallic iron can be also controlled.

DESCRIPTION OF THE PREFERRED EMBODIMENTS

Figure 1:
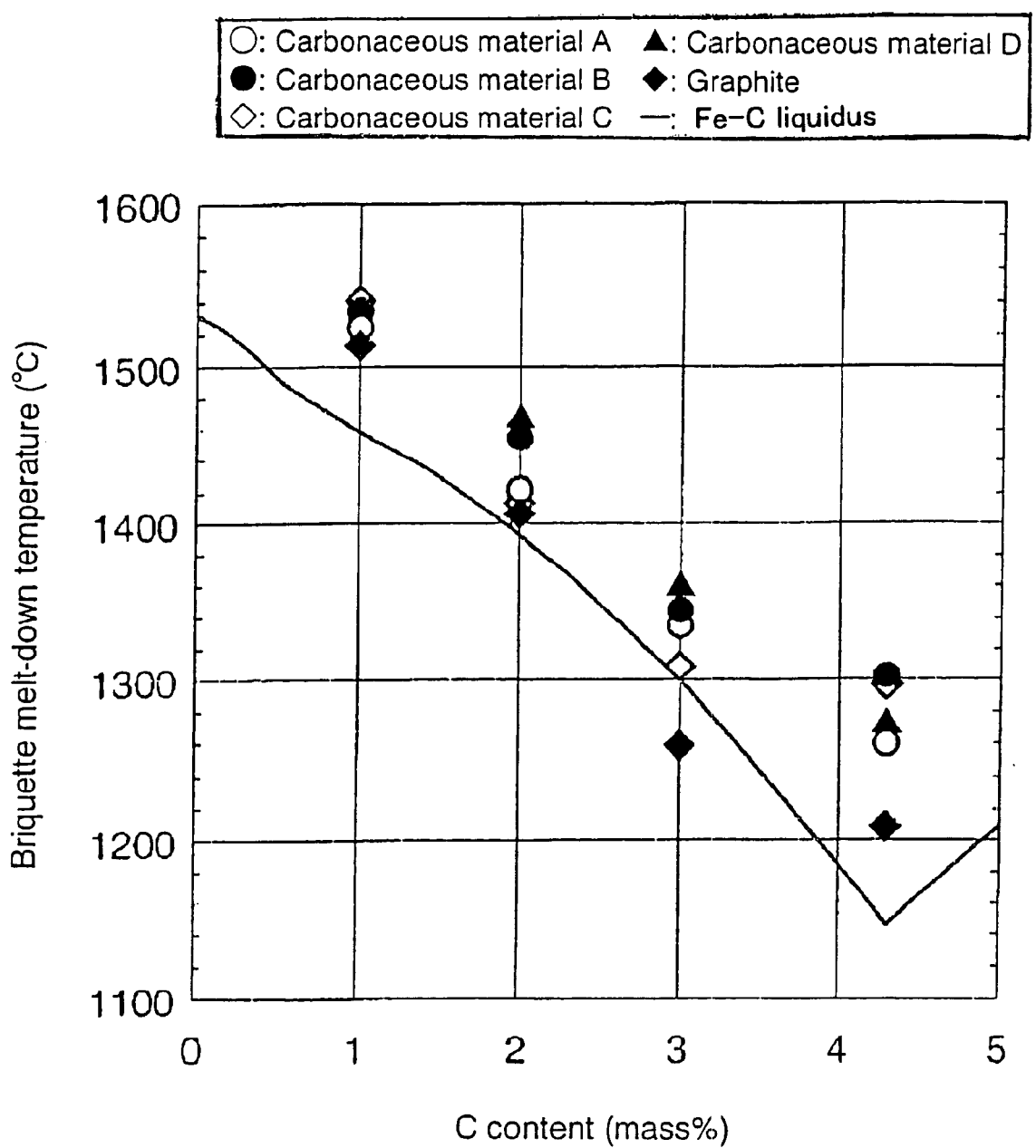
FIG. 1 is a graph showing, plotting a melting temperature when a mixture of electrolytic iron and various carbonaceous materials is heated and observed by a high temperature laser microscope to a Fe—C thermodynamic equilibrium phase digram, a relationship between a melting temperature and carbon contents.

The present invention will be explained in detail with reference to the details of experiments.

The present inventors have observed in detail, in heating, reducing and melting the raw material mixture to manufacture metallic iron, the behavior of by-produced slag in a present system of carbonaceous reducing agents, and the behavior of carburizing and melting of produced metallic iron, and the following fact was confirmed.

That is, for subjecting metallic iron produced by heating and reducing, the carburizing, it is essential that the carbonaceous reducing agents are present in the system. However, according to confirmation of the present inventors from experiments, even if the carbonaceous reducing agents are present, in a case where the carbonaceous reducing agents in the form of a solid are merely present in a state close to solid metallic iron, carburizing rarely progresses, and acceleration of melting caused by lowering of a melting point of solid reduced iron could not much expected.

However, it has been confirmed that when the carbonaceous reducing agents coexist with slag in a molten state, carburizing of solid metallic iron can be progressed extremely efficiently. This is because of the fact that molten slag having fluidity displays the carrier-like action so that it comes in contact promptly around the solid metallic iron along with the solid reducing agents to thereby accelerate carburizing. It has been confirmed that the accelerating action of carburization caused by the coexistence of molten slag is not displayed effectively only when the whole slag is in a molten state, but such an action changes depending on the liquid fraction of the slag in a solid and liquid coexisting state.

So, for confirming the influence of the liquid fraction of the by-produced slag on carburizing of metallic iron, a compact substance (briquette) by mixing iron oxide powder and reducing carbonaceous material powder is used, and the behavior during heating, reducing and melting was observed by a high temperature laser microscope and the producing behavior of a molten substance was observed quantitatively by image analysis. That is, in this observation, the liquid fraction of the raw material compact during heating and temperature rising is obtained by image analysis to serve as a rate of a molten substance. Further, a temperature at which the liquid fraction is 100% during heating was defined as a melt-down temperature.

The liquid fraction termed herein is located between solidus and liquidus, and is defined as a mass ratio of liquid occupied in solid+liquid (that is, solid phase+liquid phase). In the above-described observation with high temperature laser microscope, the mass ratio was replaced by an area ratio of image analysis. Further, a predicted liquid fraction described later means a value predicated from a gangue component composition and a temperature by a multi-system phase diagram.

First, C % (carburizing amount) in metallic iron and a melt-down temperature of the metallic iron (that is, a melting point) were investigated. Electrolytic iron powder was used as metallic iron, graphite and 4 kinds of coal powder shown in the following TABLE 1 were used as a carbonaceous material, and mixing was made so that concentrations of fixed carbon with respect to electrolytic iron powder are 1% (which means mass %, the same is true for the following), 2%, 3% and 4.3%. Measured melting temperatures are shown in the Fe—C phase diagram of FIG. 1.

TABLE 1

| Kind of carbonaceous material | Analyzed value (mass %) | | | |
|---|---|---|---|---|
| | Fixed Carbon Amount | Volatile amount | Ash amount | Sulfur content |
| A | 69.39 | 21.25 | 9.36 | 0.334 |
| B | 71.6 | 19.6 | 8.8 | 0.53 |
| C | 53.63 | 36.41 | 9.95 | 0.32 |
| D | 77.1 | 5.9 | 17 | 0.21 |

As will be apparent also from FIG. 1, it is understood that in a case where graphite is used as a carbonaceous material, it melts down substantially along the liluidus in the phase diagram, and a melt-down temperature is substantially decided according to a carbon concentration in metallic iron subjected to carburizing. On the other hand, in a case where coal containing ash is used as a carbonaceous material, the melt-down temperature is on the high temperature side from the liquidus in the phase diagram, suggesting that the ash in coal influences on the melt-down temperature of metallic iron, that is, carburizing.

Next, electrolytic iron powder and the carbonaceous material having a composition shown in TABLE 1 are combined, and for changing the liquid fraction of slag produced from the ash in coal, CaO (reagent) is added to coal powder to thereby change CaO % of the produced slag. The mixing amount of carbonaceous material was adjusted so as to be 4.3% in concentration of carbon in electrolytic iron.

The sample was subjected to observation with high temperature laser microscope in a manner similar to that as described above to measure a melt-down temperature of each mixture of electrolytic iron and carbonaceous material. Further, the liquid fraction at 1300° C. in the respective slag component composition was computed from the phase diagram. Since the liquid fraction is defined as the mass ratio between the liquidus and the solidus as mentioned above, the liquid fraction of each slag can be calculated from the composition of the slag component and the temperature using the multi-component system phase diagram.

Figure 2:
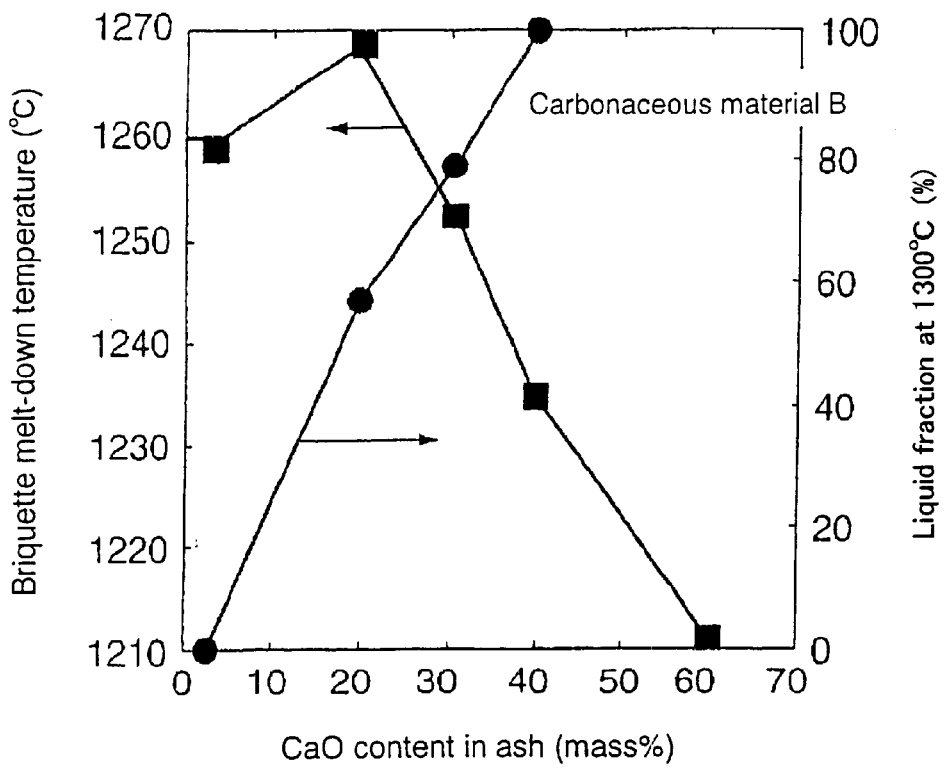
FIG. 2 is a graph showing, when a mixture of electrolytic iron and commercially available carbonaceous material is used to vary CaO addition amount (CaO amount in ashes resulting from carbonaceous material) to the mixture, a relationship between a melt-down temperature of raw material and a liquid fraction.
Figure 3:
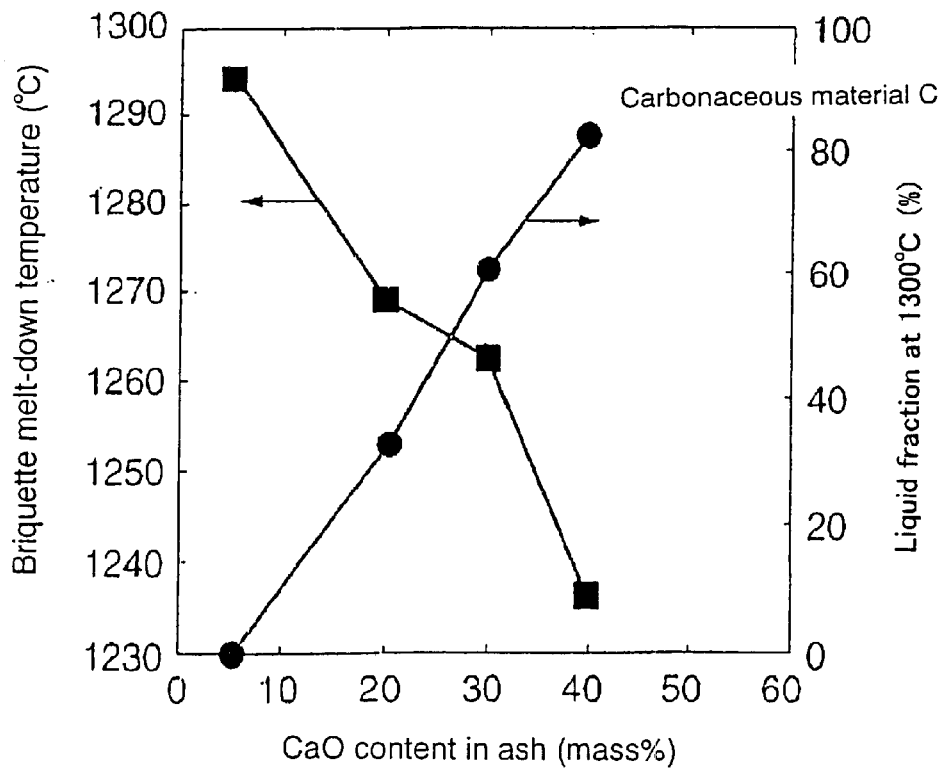
FIG. 3 is a graph showing, when a mixture of electrolytic iron and the other commercially available carbonaceous material is used to vary CaO addition amount (CaO amount in ashes resulting from carbon) to the mixture, a relationship between a melt-down temperature of raw material and a liquid fraction.
Figure 4:
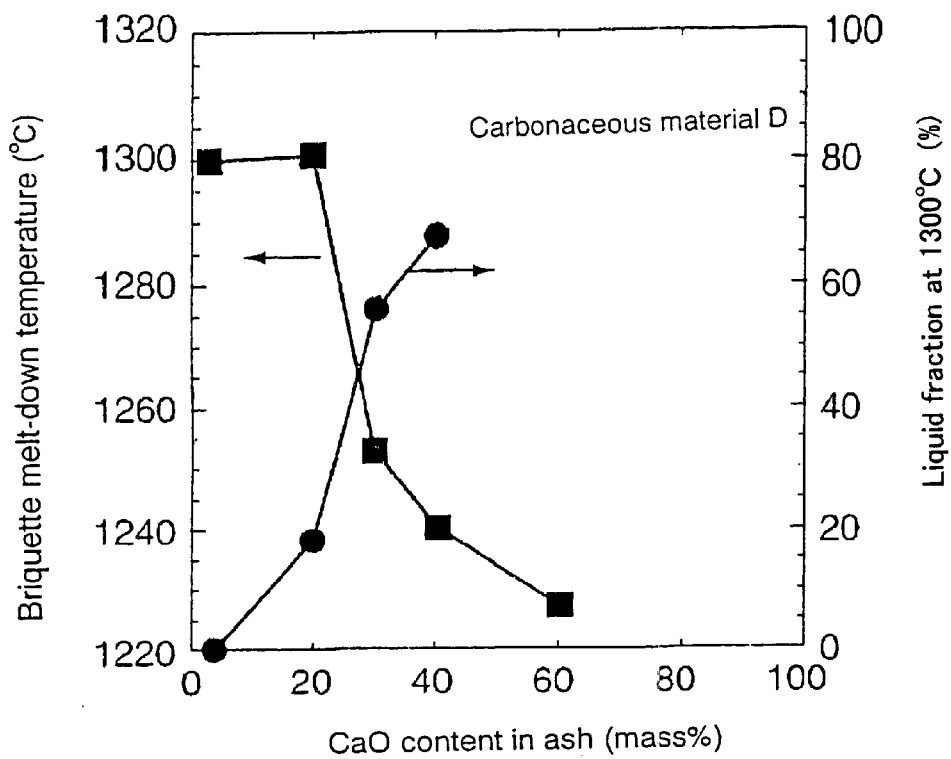
FIG. 4 is a graph showing, when a mixture of electrolytic iron and another commercially available carbonaceous material is used to vary CaO addition amount (CaO amount in ashes resulting from carbon) to the mixture, a relationship between a melt-down temperature of raw material and a liquid fraction.

The results are as shown in FIGS. 2 to 4, and analysis can be made from these drawings as follows:

1) Even in a case where anyone of carbonaceous material is used, the melt-down temperature lowers as CaO concentration in the slag forming components (ash and added CaO) rises, and the liquid fraction of the produced slag at 1300° C. increases as the CaO concentration rises.

2) The melt-down temperature of metallic iron lowers as the liquid fraction of the produced slag rises. Since the fact that the melt-down temperature of metallic iron depends on the carburizing amount has been already confirmed in FIG. 1, the carburizing amount into metallic iron increases as the liquid fraction of slag rises, and the fact that the melt-down temperature lowered with the increase in carbon concentration in metallic iron can be confirmed.

That is, as will be apparent from these results of experiments, when a carbonaceous material containing ash is used as carbonaceous reducing agents to heat, reduce and melt a raw material mixture of the former and iron oxide, the melt-down temperature of produced metallic iron considerably varies according to the CaO amount added to the raw material mixture, and the melt-down temperature rapidly lowers as the CaO amount increases. On the other hand, conversely, the liquid fractions of the produced slag rapidly increases as the CaO amount increases. From the tendency as described above, it is possible to know the tendency that when the liquid fraction of the produced slag is increased by addition of CaO, the melt-down temperature of the produced metallic iron rapidly lowers. That is, there can be confirmed that as the liquid fraction of the produced slag rises, carburizing of a carbonaceous material remaining in raw material to solid reduced iron is accelerated. Judging from such tendency as described, it is understood that the carbonaceous material remaining in the raw material after the solid reducing is accompanied by the molten slag and contacts efficiently with solid reduced iron, as a result of which carburizing to solid reduced iron is accelerated, and the melt-down temperature can be lowered due to a quick drop of a melting point of solid reduced iron.

For effectively displaying the accelerating action of carburization with accompanying of carbonaceous reducing agents, the liquid fraction of the produced slag is extremely important. There is some difference in viscosity (fluidity) of the liquid slag, but it has been confirmed that if the rate of the molten slag occupied in the produced slag in the solid and liquid coexisting state, that is, the liquid fraction is not less than 50%, more preferably not less than 70%, a drop of a melting point of the solid reduced iron caused by the carburizing progresses rapidly, and the quick melt-down can be realized at a relatively low temperature.

The liquid fraction of the produced slag may be adjusted by the raw material mixing (the content and composition of slag component in iron oxide and ash in carbonaceous material) when the raw material mixture is prepared so as to have a proper slag composition according to the target operating temperature (particularly, the target melt-down temperature). More preferably, by obtaining a relation between the temperature of the produced slag and the liquid fraction in advance from the composition of the slag component in the raw material mixture and by adding and adjusting the other slag forming component as necessary, the proper slag liquid fraction can be secured in a target melt-down temperature region.

In other words, according to the present invention, the melt-down temperature can be controlled according to the slag composition in the raw material, or slag composition can be adjusted to be a predetermined liquid fraction under a given melt-down temperature by setting the melt down temperature in advance.

Such a phenomenon as described above appears as a similar tendency also in a case where iron ore contains a considerable amount of gangue components as an iron oxide source. If the liquid fraction of multi-component slag formed from the gangue components and the ash in the carbonaceous material is controlled property under the operating temperature, the carburizing of solid produced metallic iron can proceed efficiently, and the melt-down temperature of the solid metallic iron can be lowered considerably.

The control of the liquid fraction of the produced slag in carrying out the present invention can be made by mixing several iron ores so as to have a proper slag composition according to the gangue components contained in iron ore used as an iron oxide source. Preferably, there is a method to add one or not less than two kinds of lime (CaO), lime stone ($CaCO_3$), silica ($SiO_2$), serpentine (MgO), manganese ore (MnO), bauxite ($Al_2O_3$), etc. as additives capable of changing the liquid fraction according to the gangue component contained in the raw material ore. More specifically, when an iron oxide source and carbonaceous reducing agents, and a binder component if necessary are mixed to prepare a raw material mixture, a relation between a temperature and a liquid faction is obtained on the basis of a multi-component system phase diagram from a gangue composition contained in the raw materials, and a suitable amount of oxide as described above are mixed as additives so as to have a proper liquid fraction as mentioned above at a target melt-down temperature.

For effectively displaying the acceleration of carburization by accompanying molten slag and lowering action of the melt-down temperature as mentioned above, it is necessary to causes a sufficient drop of a melting point of solid metallic by carburizing. It has been confirmed that it is most effective to control carbon concentration of metallic iron after carburizing in a range of 0.5 to 4.3%, more preferably, 1.5 to 3.5%, and to control a melt-down temperature in a range of 1147 to 1500° C., more preferably, in a range of 1200 to 1450° C. Preferable carbon concentration of metallic iron after carburizing may be adjusted according to the amount of carbonaceous reducing agents mixed in the raw material preparation stage. In concrete, carbonaceous reducing agents necessary for carburization is added on the amount which are theoretically required for the reduction of the iron oxide source. However, under the normal operating conditions, a part of carbonaceous reducing agents is consumed by oxidizing gas produced by burner combustion during heating and reducing, and therefore, in actually to decide the carbonaceous material mixing amount, the mixing amount should be adjusted in consideration of the consuming amount as described.

Further, if the mixing amount of the carbonaceous reducing agents is adjusted as described above at the raw material preparation, the carburizing amount to metallic iron can be controlled, whereby the final carbon content of metallic iron can be adjusted as purposed.

In the raw material mixture used in the present invention, preferably, both the iron oxide source and the carbonaceous reducing agents are used in a powder state. The raw material mixture may be supplied in a state of being lightly pressed on the hearth, but preferably, if it is supplied as a compact in which the mixture is agglomerated into a suitable shape such as spherical, briquette, or pellet shape, a metallic shell of solid reduced iron is formed on the surface of the compact during reducing solid by heating, to enable keeping the inside at a high reducing potential, and it is preferable that the metallizing rate can be enhanced more efficiently.

Further, the furnace used in the present invention is preferably, a moving hearth type furnace, and a rotary hearth furnace is particularly preferable. In this case, raw materials adjusted so as to have a liquid fraction desired in advance are laid on the hearth by a pipe-like or tray-like feeding device so as to be not more than two layers in case of wider and larger-diameter compact. Material is heated from the top by a burner or the like to reduce and melt it and after cooling, it is discharged by a scraper or a screw type discharge device. If, prior to feeding raw material, a layer of powder carbon-contain substances is formed or a layer of powder fire-proof substances such as alumina is formed, that is preferable from the points of protection of a hearth, smoother of product discharge, and prevention of re-oxidization from the end of the reduction to melting.

When metallic iron, which is carburized and molten and coagulated after being heated and reduced, is cooled and solidified, metallic iron particles can be obtained, and can be separated from the produced slag simultaneously by sieving or magnetic separation.

As described above, the present invention is characterized in that the liquid fraction of the by-produced slag is controlled to thereby accelerate carburizing and proceed the melt-down of metallic iron at a low temperature and efficiently, and finally, metallic iron particles of high metallization degree, that is high Fe purity, can be manufactured efficiently. It has been confirmed that the secondary effect as shown below can be also obtained by the control of the liquid fraction of the by-produced slag.

That is, in carrying out the method of the present invention for controlling the liquid fraction of the produced slag to control the melt-down temperature of metallic iron, the produced slag under the melt-down temperature condition displays the solid and liquid coexisting state, and when it is cooled and solidified the coagulated slag produced from the liquid phase of the solid and liquid coexisting phase is condensed by the surface tension into a glassy granular substance, whereas the coagulated slag produced from the solid phase of the solid and liquid coexisting phase is turned into a fine granular slag. Accordingly, when these slags are classified through a suitable sieve, they can be separated into a glassy granular slag and fine granular slag. Since the thus separated slag can be recovered as one in which the size distribution is narrow and uniform size, the separated slag is extremely advantageous also when as secondary resources such as roadbed material or aggregate for concrete as fine aggregate or rough aggregate.

Further, the present inventors have also studied the molten wustite (FeO) produced during heating and reducing to suppress refractory damage caused by molten FeO in slag by-produced in reducing and melting, which result of study will be also explained.

In the experiments, supposing the slag composition from iron oxide source and carbonaceous material, using a synthesized slag in which FeO was added in the base slag of $SiO_2$: $Al_2O_3$: GaO=70:2:5 (mass ratio), a relation between heating speed and a liquid fraction during heating was investigated.

Figure 5:
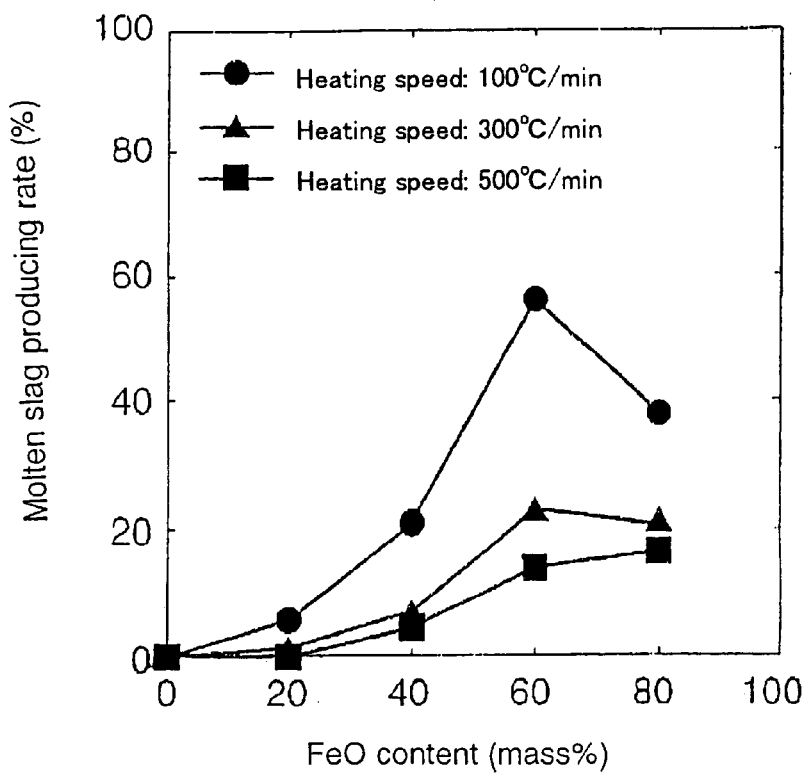
FIG. 5 is a graph showing the influence on a liquid fraction of a producing slag and the FeO content to the slag when a heating speed is changed when a mixture of iron oxide whose gangue component amount is constant and carbonaceous material are heated and reduced.

The results are shown in FIG. 5. This figure shows a change of FeO concentration and ratio of liquid (that is, a liquid fraction) when a heating temperature is 1156° C. constant, a heating speed was changed to 100° C./min., 300° C./min., 500° C./min., as a parameter. As will be apparent from this figure, tendency that the liquid fraction increases as FeO concentration becomes high, but the liquid fraction is markedly changed by the heating speed, and the liquid fraction becomes rapidly high as the heating speed slows.

This indicates that in heating, reducing and melting a raw material mixture, when the heating speed is slow in the stage of FeO during the reduction, FeO is united with the gangue component and melted down and produces liquid and molten slag containing large amount of FeO is easily generated.

Conversely, the heating speed is raised, it loses the time for FeO to melt in to the slag, the mixing of molten FeO into slag is suppressed as a consequence that iron oxide is reduced rapidly to metallic iron under the high speed heating condition.

It has been confirmed that the effect of reducing the molten FeO content in the slag caused by the heating speed as described above was displayed effectively by raising speed during heating and reducing to not less than 300° C./min., preferably, not less than 400° C./min., more preferably, not less than 500° C./min.

It has been further confirmed from the studies carried out separately by the present inventors that the refractories damage caused by molten FeO mixing into slag remarkably changes at a boundary that the molten FeO amount in slag is approximately 50%, and if the heating speed is controlled so that the molten FeO amount is not more than about 50%, preferably, not more than about 20%, more preferably, substantially 0%, the damage of the hearth refractory caused by the molten slag can be suppressed as less as possible, and enable to simplify the particular countermeasure preventing the refractory damage employed in the related art.

Further, the preferable conditions for making the FeO amount in the molten slag preferable not more than about 20% or substantially zero are that the temperature regions of 600 to 1350° C., preferably, 500 to 1250° C. during heating and reducing are risen at the speed of not less than 300° C./min., preferably, not less than 500° C./min.

The reduction of FeO content in the molten slag as described above effectively acts on the prevention of refractory damage of the hearth which is extremely important in the actual operation, and in addition, enhancement of yield as metallic iron, and further, the increase in the heating speed shorten heating and reducing time and enhances the productivity resulting therefrom.

Further, when the liquid fraction of the produced slag becomes excessively high in the stage of solid reduction, the raw material compact starts melting-down before the solid reduction proceeds sufficiently so that the unreduced FeO tends to melt into the molten slag, but in such a case as described, it is also effective that the flux material for adjusting slag composition (oxides as mentioned above) is added in a suitable amount in the preparation stage of raw material, and generation of melt in a low temperature region is suppressed to rise a reducing temperature, thus raising the solid reduction speed. That is, when the present invention is carried out, the adjustment of the liquid fraction of the produced slag can be effectively employed as means for enhancing the productivity positively by rising liquid generating temperature (that is, start temperature of carburizing) and increasing the solid reducing speed by rising a reduction temperature in addition to the case when lowering the operating temperature by decreaseing carburizing temperature corresponding to the melting temperature.

EXAMPLES

The constitution, operation and effect of the present invention will be described in detail with reference to Examples. Of course, the present invention is not limited by the following example, and suitable modifications may be made within the range capable being fitted to aims described previously and later, which are included in the technical range of the present invention.

Ore of component compositions shown in TABLE 2 below and carbonaceous material of component compositions shown in TABLE 3 were used to carry out the following experiments.

TABLE 2

| Kind of ore | Component composition (mass %) | | | | |
|---|---|---|---|---|---|
| | T. Fe | FeO | $SiO_2$ | $Al_2O_3$ | CaO |
| A | 68.06 | | 1.36 | 0.52 | |
| B | 69.2 | 30.56 | 1.81 | 0.51 | 0.45 |

TABLE 3

| Kind of carbonaceous material | Component composition (mass %) | | |
|---|---|---|---|
| | Ash | Volatile | Fixed Carbon |
| A | 8.80 | 19.60 | 71.60 |
| B | 9.36 | 21.25 | 69.39 |
| C | 12.36 | 17.77 | 69.87 |
| D | 17.0 | 5.90 | 77.1 |

Example 1

Experimental Example Having an Operating Temperature Changed in the Same Mixing

Raw material used was prepared by evenly mixing ore B (average grain diameter: 21 µm) 83.5 mass % shown in TABLE 2, carbonaceous material C (average grain diameter: 45 µm) 18.5 mass % shown in TABLE 3, and bentonite (average grain diameter: 9 µm) 1.0 mass % as a binder, agglomerated it into a substantially spherical shape having a diameter of about 17 mm (hereinafter called compact), after which it is preliminarily dried at 120° C.

The raw material compact is charged into an experimental furnace for heating and rising temperature, and the melt-down behavior of the raw material compact at a given temperature was observed to investigate a relation with a liquid fraction of produced slag estimated from a raw material component. In a case when no melt-down occurs, the surface state and the internal cross section were observed. The result shown in TABLE 4 below was obtained.

TABLE 4

Sample temperature, estimated liquid fraction and melt-down behavior

| Sample Temp. (° C.) | Estimated liquid fraction (%) | Melt-down behavior of compact |
|---|---|---|
| 1280 | 0 | No molten substance inside reduced iron |
| 1330 | 24.7 | Maintain surface shape, and traces of liquid generation inside |
| 1370 | 55.3 | Maintain surface shape, and inside is a molten state |
| 1400 | 77.0 | Completely melt-down |
| 1450 | 100 | Completely melt-down |

As will be apparent from TABLE 4, when the estimated liquid fraction is 0%, no traces of the molten substance is found in the compact; and when the estimated liquid fraction is about 25%, traces of the molten substance are found inside but the compact keeps its original shape, and no melt-down is found. Further, when the estimated liquid fraction rises up to 55% level, production of a considerable amount of molten substances is found, but the compact keeps its original shape, and no melt-down (carburizing and melting of metallic iron, and flow-down).

On the other hand, it has been confirmed that the estimated liquid fraction reaches 100%, the compact becomes molten to produce the melt-down, but even at the time when the liquid fraction reaches 77%, solid reduced iron in the compact starts melting and completes the molten down. That is, it has been confirmed that the heating and reducing of the compact progress as the heating temperature rises, and at the same time, the estimated liquid fraction also rises, but when the liquid fraction exceeds about 70%, the melt-down rapidly progresses.

It is understood, as will be apparent from the experimental result, that if temperature is controlled to obtain the liquid fraction of a 70% level, the sufficient melt-down could occur and the operating temperature can be dropped by about 50° C. by setting the heating temperature at 1400° C. and keeping the liquid fraction at the level of 70 to 80% without raising the liquid fraction to 100% by rising the heating temperature to 1450° C.

Example 2

Case Where Silica is Added to Change a Liquid Fraction

Ore A (average grain diameter: 38 $\mu$m) 74.6 mass % shown in TABLE 2, carbonaceous material A (average grain diameter: 37 $\mu$m) 23.4 mass % shown in TABLE 3, and bentonite (average grain diameter: 9 $\mu$m) 2.0 mass % as a binder, which are a base composition, to which is mixed silica ($SiO_2$ content: 92.7 mass %) in a suitable amount to thereby adjust a melt-down temperature of a slag. A liquid fraction at 1200° C. estimated from the phase diagram based on the slag composition in the mixed raw material is as shown in TABLE 5. A raw material compact was used after mixing the above substances in uniform to agglomerate it into a spherical shape of particle diameter 17 mm and drying at 120° C.

The raw material compact is charged into a heating and reducing, experimental furnace atmospheric temperature at the time when the raw material compact melts down was measured, and the result described in TABLE 5 was obtained.

TABLE 5

Change of liquid fraction caused by silica mixing and Atmosphere temperature at the melt-down

| Silica mixing rate (mass %) | 0 | 0.8 | 2.4 |
|---|---|---|---|
| Liquid fraction (%) at 1200° C. | 77 | 85 | 96 |
| Atmospheric temp. at melt-down | 1435 | 1425 | 1405 |

As will be apparent from TABLE 5, by raising the mixing rate of silica, the liquid fraction at 1200° C. of produced slag increases, and the melt-down temperature of the raw material compact lowers accordingly. That is, from the results, if a suitable amount of $SiO_2$ source (or other oxide) is mixed into the raw material component to control the liquid fraction at an operating temperature, the melt-down temperature of the compact heated and reduced, that is, the operating temperature can be lowered. Further, the additional amount of the fluxing material (such as a $SiO_2$ source) is adjusted so that if the target operating temperature is determined, the liquid fraction enough for the melt-down at the operating temperature is obtained to thereby enable substantially adjusting the melt-down temperature to the operating temperature.

Example 3

Case Where a Liquid Phase Generating Temperature is Risen to Accelerate the Progress of Solid Reduction As described previously, in a case where a liquid phase of produced slag generates at a low temperature, the melt-down of the compact occurs before the reduction of iron oxide contained in a solid phase progresses sufficiently, and unreduced FeO becomes molten and mixed into slag materially to accelerate erosion and/or corrosion of the hearth refractory. Accordingly, from a viewpoint of preventing the damage of refractories of the hearth, an experiment in a case where the present invention is used practically was conducted.

That is, raw material was prepared by mixing in the ratio of cases A and B shown in TABLE 6 below, and was formed into a spherical shape similarly to that described above, and a heating, reducing and melting experiment was conducted to obtain the result shown in TABLE 6 after drying the compact.

TABLE 6

Mixing of raw materials, liquid phase generating temperature and so on

Liquid phase

|  | Ore C | Carbonaceous material B | Binder | Added CaO | generating temp. (° C.) | Reduction temp. (° C.) | Melting temp. (° C.) |
|---|---|---|---|---|---|---|---|
| Case A | 76.54 | 21.81 | 1.65 | — | 1177 | 1320 | 1430 |
| Case B | 72.51 | 20.99 | 1.5 | 5 | 1332 | 1340 | 1430 |

In TABLE 6, in the mixing of Case A, the liquid phase generating temperature is low as 1177° C., and liquid is produced before solid reduction progresses sufficiently, and mixing of unreduced FeO into produced slag brings damage of the hearth refractory. So, the heating and reducing temperature is somewhat lowered into 1320° C., as a consequence of which the solid reducing speed lowers and the production speed lowers considerably. So, the mixing ratio was changed as Case B (additional mixing of lime stone) and liquid phase generating temperature was risen into 1332° C. Then, it has been confirmed that when the heating and reducing temperature and the melt-down temperature were set to 1340° C. and 1430° C., respectively, whereby the smooth operation can be maintained without the damage of the hearth refractory.

Further, the produced substance obtained in the above case B was cooled and afterward subjected to magnetic separation, then it could be separated into a metal and a slag substantially completely. The particle diameter distribution of the metal and the slag obtained is as shown in TABLE 7. It is understood that the metal particle having diameter (the substantially circular shape is represented by a diameter, and the ellipse or oval shape is represented by an average value between long diameter and short diameter) not less than 3.35 mm may be well recovered with yield of 94.3%. On the other hand, the slag is generally divided into two, a glassy granular slag having particle diameter not less than 3.35 mm, and a granular powder slag having particle diameter less than 3.35 mm. It has been confirmed that the granular powder slag is recycled to a raw material processing system to enable recovery and using of residual carbonaceous material and iron, and the glassy granular slag can be effectively used for fine aggregates without containing iron.

TABLE 7

Particle diameter distribution of metal and slag after magnetic separation of products

| Particle diameter (mm) | Above 6.7 | 3.35 to 6.7 | Less than 3.35 |
|---|---|---|---|
| Metal (mass %) | 84.3 | 10.0 | 5.7 |
| Slag (mass %) | 34.4 | 17.5 | 48.1 |

The present invention being constituted as described above, in heating, reducing and melting a mixture containing an iron oxide source and carbonaceous reducing agents to manufacture metallic iron, a liquid fraction occupied in a solid and liquid coexisting phase of produced slag is controlled properly to thereby enable suitable adjustment of a carburizing start temperature of solid metallic iron, and various operations and effects as shown below accordingly:

1) A relation between a temperature and a liquid fractions of produced slag is obtained by a slag forming component in raw material and an amount of fluxing material added thereto, the liquid fraction is adjusted whereby a carburizing start temperature, that is, a melt-down temperature of raw material can be controlled, and the melt-down temperature is lowered to thereby enable lowering of an operating temperature to enhance thermal energy efficiency and suppress thermal deterioration of a heat resistance structure.

2) If a liquid fraction of produced slag in a predetermined temperature region is obtained in the raw material mixing stage, a melt-down temperature as a substantially target can be given, and a temperature can be adjusted to a suitable melt-down temperature according to thermal efficiency of operating equipment and heat resistance of equipment, thus facilitating correspondence to various operating equipment.

3) Carburizing start temperature, that is, a melt-down temperature can be adjusted by adjustment of a liquid fraction without melting the whole amount of produced slag to enable lowering of an operating temperature as a result and enable saving of necessary energy and enhancement of thermal efficiency.

4) If a mixing amount of carbonaceous reducing agents is adjusted in the raw material preparing stage, carbon contents of metallic iron obtained can be controlled substantially as in target, and metallic iron in a suitable carbon content according to uses.

5) The liquid fraction of produced slag is controlled whereby an optimum melt-down temperature can be set adjusting to a completion temperature of heating and reducing, and as a result, mixing of molten FeO amount into molten slag can be suppressed as less as possible. Particularly, if a heating speed during heating and reducing is controlled properly, production of molten slag can be suppressed as less as possible to enable prevention of fusion or sticking of produced substances onto the hearth caused by production of slag having a low melting point containing molten FeO, and enable effective suppression of erosion and/or corrosion of the hearth refractory.

6) As the secondary effect of the present invention, the slag by-produced is separated into a glassy granular slag obtained from the liquid phase and a granular slag obtained from a solid phase to obtain them as by-product having narrow particle-size distribution, which can be effectively used for various uses as fine aggregates or rough aggregates.

We claim:

1. A method for producing metallic iron, the method comprising heating a raw material mixture containing a carbonaceous reducing agent and an iron oxide-containing substance;

reducing the iron oxide-containing substance to produce solid metallic iron and a slag comprising coexisting solid and liquid fractions; and carburizing and melting the solid metallic iron, wherein the liquid fraction of the slag at the time of the carburizing and melting is in a range of from 50 to 80%.

2. The method according to claim 1, wherein the liquid fraction of the slag is accompanied with carbon; and the carburizing and melting comprises contacting the solid metallic iron with the liquid fraction of the slag and carbon to reduce a melting temperature of the solid metallic iron.

3. The method according to claim 2, wherein the carburizing and melting of the solid metallic iron results in a carburized metallic iron comprising 0.5 to 4.3 mass % carbon and having a melting temperature of in a range of from 1147 to 1500° C.

4. The method according to claim 1, further comprising mixing a raw material with the raw material mixture.

5. The method according to claim 1, further comprising
establishing, before the heating, a predetermined operating temperature and a predetermined liquid fraction of the slag; and
adding to the raw material mixture, before the heating, a slag forming component such that at the predetermined operating temperature the liquid fraction of the slag is equal to the predetermined liquid fraction.

6. The method according to claim 1, further comprising
establishing, before the heating, a predetermined operating temperature, wherein
the heating heats the raw material mixture to the predetermined operating temperature.

7. The method according to claim 1, wherein the liquid fraction of the slag at the time of the carburizing and melting is in a range of from 70 to 80 mass %.

8. The method according to claim 1, wherein the raw material mixture comprises agglomerates containing the carbonaceous reducing agent and the iron oxide-containing substance.

9. The method according to claim 1, further comprising adjusting the liquid fraction of the slag to control an amount of carbon in the solid metallic iron.

10. The method according to claim 1, further comprising adjusting the liquid fraction of the slag to control a concentration of carbon in the metallic iron after the carburizing and melting.

11. The method according to claim 1, wherein
the carburizing and melting forms molten iron; and
the method further comprises solidifying the molten iron to form solid iron particles.

12. The method according to claim 1, further comprising
cooling the slag to produce a first granular slag from the liquid fraction and a second granular slag from the solid fraction; and
separating the first granular slag from the second granular slag.

13. The method according to claim 1, wherein the liquid fraction of the slag comprises no more than 50 mass % FeO.

14. The method according to claim 1, wherein the the liquid fraction of the slag comprises substantially 0 mass % FeO.

15. The method according to claim 1, wherein the heating comprises raising a temperature of the raw material mixture at a rate of not less than 300° C./min.

* * * * *